(12) United States Patent
Ouvry et al.

(10) Patent No.: US 7,817,709 B2
(45) Date of Patent: Oct. 19, 2010

(54) NON-COHERENT PHASE DIFFERENTIAL AND MULTIPLE ORTHOGONAL SIGNAL RECEPTION

(75) Inventors: Laurent Ouvry, Grenoble (FR); Jean-René Lequepeys, Fontaine (FR); Norbert Daniele, Montbonnot (FR); Dominique Noguet, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/253,192

(22) Filed: Oct. 17, 2005

(65) Prior Publication Data

US 2006/0109936 A1 May 25, 2006

Related U.S. Application Data

(63) Continuation of application No. 09/935,548, filed on Aug. 24, 2001, now Pat. No. 6,956,913.

(30) Foreign Application Priority Data

Aug. 28, 2000 (FR) .................................. 00 10981

(51) Int. Cl.
*H04B 1/707* (2006.01)
*H04L 27/22* (2006.01)
*H04L 27/233* (2006.01)

(52) U.S. Cl. ...................... 375/147; 375/330; 375/340

(58) Field of Classification Search ................ 375/142, 375/144, 147, 148, 260, 329, 330, 343, 349, 375/350, 347, 150, 130, 139, 152, 316, 322, 375/324, 340, 346, 354, 362, 365, 367, 141, 375/143, 259, 283, 331, 271, 279, 280, 281; 370/203, 208, 334, 335, 342, 349, 241, 252, 370/310, 340, 341, 464, 480; 329/304, 345, 329/346

See application file for complete search history.

(56) References Cited

U.S. PATENT DOCUMENTS 3,819,919 A * 6/1974 McGunigle .................. 702/45
4,222,115 A * 9/1980 Cooper et al. ............... 375/130

(Continued)

FOREIGN PATENT DOCUMENTS

EP 0 793 371 A1 * 11/1997

(Continued)

OTHER PUBLICATIONS

A.K. Elhakeem, et al., IEEE Journal on Selected Areas in Communicatins, vol. 10, No. 4, pp. 690-704, "Modified Sugar/DS: A New CDMA Scheme," May 1, 1992.*

*Primary Examiner*—Betsy L Deppe
(74) *Attorney, Agent, or Firm*—Connolly Bove Lodge & Hutz LLP (57) ABSTRACT

Embodiments for non-coherent phase differential and multiple orthogonal signal modulation/demodulation are disclosed. One illustrative embodiment may include: a method for non-coherent reception of a signal with spectrum spreading, comprising performing a multiple orthogonal signal demodulation operation on the signal; performing a phase differential demodulation operation on the signal; and combining the results of the multiple orthogonal signal demodulation operation on the signal and the phase differential demodulation operation on the signal.

33 Claims, 5 Drawing Sheets

U.S. PATENT DOCUMENTS

| | | | | |
|---|---|---|---|---|
| 4,328,582 A * | 5/1982 | Battail et al. | .................. | 714/780 |
| 4,567,588 A * | 1/1986 | Jerrim | ........................ | 370/479 |
| 5,396,516 A * | 3/1995 | Padovani et al. | ............. | 375/225 |
| 5,544,155 A * | 8/1996 | Lucas et al. | .................. | 370/342 |
| 5,557,644 A * | 9/1996 | Kuwabara | .................... | 375/340 |
| 5,692,007 A * | 11/1997 | Durrant et al. | ............... | 375/142 |
| 5,790,589 A * | 8/1998 | Hutchison et al. | ............ | 375/149 |
| 5,822,363 A * | 10/1998 | Le Roy | ........................ | 375/143 |
| 6,289,041 B1 * | 9/2001 | Krasner | ...................... | 375/152 |
| 6,574,283 B1 * | 6/2003 | Sakoda et al. | ................. | 375/262 |
| 6,678,338 B1 * | 1/2004 | Noguet et al. | ................ | 375/330 |
| 6,778,514 B1 * | 8/2004 | Boccuzzi et al. | ............. | 370/334 |
| 6,868,056 B1 * | 3/2005 | Sudo | ........................... | 370/210 |
| 7,016,425 B1 * | 3/2006 | Kraiem | ........................ | 375/261 |

FOREIGN PATENT DOCUMENTS

| EP | 0952678 | * | 1/1999 |
|---|---|---|---|
| EP | 1065849 | * | 1/2001 |

* cited by examiner

NON-COHERENT PHASE DIFFERENTIAL AND MULTIPLE ORTHOGONAL SIGNAL RECEPTION

CROSS-REFERENCE TO RELATED APPLICATIONS

This application is a continuation of U.S. application Ser. No. 09/935,548, now U.S. Pat. No. 6,956,913 filed Aug. 24, 2001, entitled "Non-Coherent DP-MOK Reception Process with Combination of Multiple Paths and Corresponding Receiver".

TECHNICAL FIELD

The purpose of this invention is a process for non-coherent differential phase-multi-orthogonal keying (DP-MOK) reception with combination of multiple paths and corresponding receiver.

The invention has a general application in digital communications and more particularly in Wireless Local Area Networks (WLAN), in subscriber Wireless Local Loops (WLL), in mobile telephony, domotics and remote collection, communication in transport systems, etc.

STATE OF PRIOR ART

The invention originates from the spectrum spreading technique. It is known that this technique consists of modulation of a digital symbol to be transmitted using a pseudo-random sequence known to the user. Each sequence is composed of N elements called "chips", with a duration that is one $N^{th}$ of the duration of a symbol. The result is a signal for which the spectrum is spread over a range N times wider than the range of the original signal. On reception, demodulation consists of correlating the received signal with the sequence used when sending, to find the original symbol.

There are many advantages with this technique:

discretion, since the power of the signal emitted is constant and distributed in a band N times wider, its spectral power density is reduced by a factor of N;

immunity to deliberate or parasite narrow band emissions, the correlation operation done at the receiver producing spectrum spreading of these emissions;

difficulty in interception (for typical signal to noise ratios) since demodulation requires knowledge of the sequence used in emission;

resistance to multiple paths which, under some conditions, can cause selective frequency fading and therefore only partially affect the transmitted signal;

possibility of division with multiple access using Code Division Multiple Access (CDMA); several spectrum spreading links by direct sequence may share the same frequency band by using orthogonal spreading codes.

But there is a disadvantage with this technique, namely its low spectral efficiency. The spectral efficiency is the ratio between the binary data flow and the occupied band width. If each data symbol contains m bits, the binary data flow is equal to m times the flow in symbols, namely mDs. The occupied band is equal to twice the "chip" frequency, in other words 2N times the symbols flow, namely 2NDs. Finally the spectral efficiency is equal to the ratio $$\frac{mDS}{2NDS},$$

which is $$\frac{m}{2N}.$$

One approach would be to increase the spectral efficiency by reducing N, but this would degrade the qualities specific to spreading, and particularly would reduce the immunity of transmissions. Another possibility would be to increase the symbols flow, but the interference phenomenon between symbols would only be aggravated.

Another solution would be to use Code Division Multiple Access (CDMA), and particularly its synchronous variant (Multi Code—Code Division Multiple Access—MC-CDMA). But this method also has its limits related to the occurrence of multiple access interferences.

Final solution would be to increase m, the number of binary data per symbol, that would result in the use of complex modulations called higher order modulation. Remember that two of these modulations are called the PSK or "Phase Shift Keying" modulation which is a phase modulation (or coding) and the MOK (M-ary Orthogonal Keying) modulation of order M. A description is given in the following two general books:

Andrew J. VITERBI: "CDMA—Principles of Spread Spectrum Communication" Addison-Wesley Wireless Communications Series, 1975, John G. PROAKIS: "Digital Communications" McGraw-Hill International Editions, $3^{rd}$ edition, 1995.

Concerning firstly phase modulation, the usual modulation type is binary modulation denoted BPSK, or quaternary modulation denoted QPSK. For binary modulation, symbols are coded with one binary element (m=1), and for the second case the symbols are coded with two binary elements (m=2).

These modulations are usually used in their differential form (DBPSK, DQPSK), (abbreviated as "DP" in the remainder of this description). This gives good robustness in difficult channels, when no phase recuperation loop is necessary. This differential form is also very well adapted to the processing of various propagation paths.

On reception, a differential demodulator multiplies the signal to be demodulated and its delayed version by a symbol period. In the case of quaternary modulation, two channel signals are used, one channel that processes the signal component in phase with a carrier and another channel that processes the component in quadrature with the carrier.

The MOK modulation technique associates one signal selected from a set of all orthogonal signals, with each symbol to be sent. These signals may be spreading codes in the same family of orthogonal codes. In this case, the modulation also performs the spreading. But these signals may also be not perfectly orthogonal since the orthogonality constraint is not as strong as it appears. But naturally, in this case performances are not as good.

If a symbol is composed of m bits, there are $2^m$ possible configurations for the symbols. Therefore the number M of available codes needs to be equal to at least M, where $M=2^m$. If the length of these codes is N, it is known that N orthogonal codes may be found. Therefore M=N and the number of bits per symbol is limited to $\log_2 N$.

Figure 1:
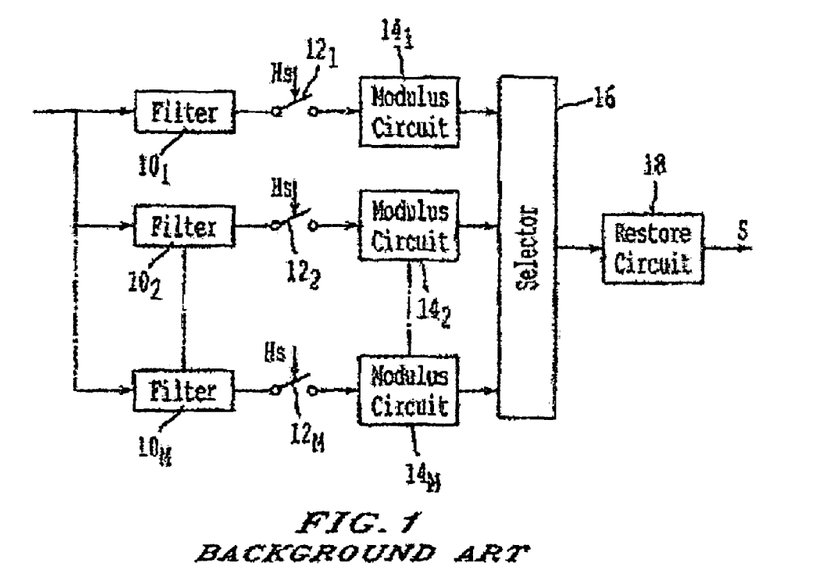
FIG. 1, already described, illustrates a MOK receiver.

It is known that MOK receiver is illustrated in FIG. 1 attached. This figure shows a bank of adapted filters $10_1$, $10_2$, ..., $10_M$, followed by the same number of samplers $12_1$, $12_2$, ..., $12_M$, circuits $14_1, 14_2, \ldots, 14_M$ for determining the modulus or the square of the modulus of the sampled signal, a circuit 16 to determine the signal with the highest modulus, in other words to determine the number of the channel with the highest signal, a circuit 18 that uses this channel number to restore the code and therefore the symbol.

There is a variant to the MOK technique called MBOK (M-ary Bi-Orthogonal Keying) that consists of adding the opposite of a set of orthogonal signals used in a MOK modulation to the signals, to create a set of 2M signals that are obviously no longer orthogonal with each other. The demodulation still uses M correlators adapted to each of the M orthogonal codes, but also requires means of recuperating the sign.

If the number of binary elements m in each symbol is increased by one unit to increase the spectral efficiency, the number M of available codes would be doubled, which would double the number of receiver channels. Therefore, the complexity increases much more quickly that the spectral efficiency. Therefore this technique is limited.

The MOK and MBOK modulations are used in some digital communication systems in liaison with a coherent reception structure, which requires knowledge of the phase of the carrier. Sending a preamble before sending useful data is a conventional process used to estimate this phase. However, in channels subject to fading and/or multiple paths, variations that may be very fast are applied to the phase of the carrier and the reception system must detect and compensate for these variations. This is usually achieved by periodically sending preambles that then occupy the channel and reduce the useful data flow. With this scheme, the durations of the preamble and the useful data packet must be less than the channel coherence time (the time during which the channel is considered to be in a stationary state). Furthermore, the complexity of the reception structure is increased.

For these reasons, an expert in the subject prefers to use non-coherent or differentially coherent demodulation schemes that do not require any knowledge of phase information. These techniques eliminate the use of long preambles, phase estimators and phase derotaters, at the price of a slight loss of sensitivity. Furthermore, non-coherent demodulation very much simplifies the processing of the diversity of propagation paths since each path has its own phase (among other properties) and therefore requires its own phase estimator in a coherent scheme.

Figure 2:
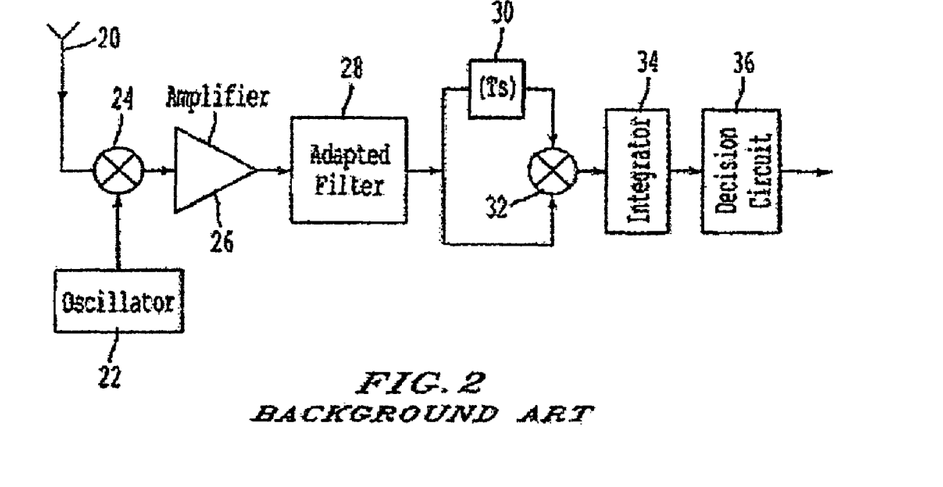
FIG. 2, already described, illustrates a known receiver for differential spectrum spreading transmission by direct sequence.

Receivers with spectrum spreading using a differential phase DP demodulation are also known. FIG. 2 attached thus shows a receiver comprising an antenna 20, a local oscillator 22, a multiplier 24, an amplifier 26, an adapted filter 28, a delay line 30, a multiplier 32, an integrator 34 and a decision circuit 36.

This receiver is based on the following operating principle.

The adapted filter 28 performs the correlation operation between the received signal and the spreading sequence that was used to send the data. The principle of differential phase modulation chosen for sending means that the information is carried by the phase difference between the signals at the output from the adapted filter 28 and the output from the delay line 30. This information is restored by the multiplier 32.

There is a correlation peak at the output from the multiplier 32, for each propagation path. The role of the integrator 34 consists of taking account of information provided by each propagation path. Since the propagation paths in an environment with multiple paths are statistically independent, this particular receiver technique uses a processing based on diversity, that may have a very high order when the pulse response is complex. The decision circuit 26 is used to recover the sent data and also to regenerate the clock.

Figure 3:
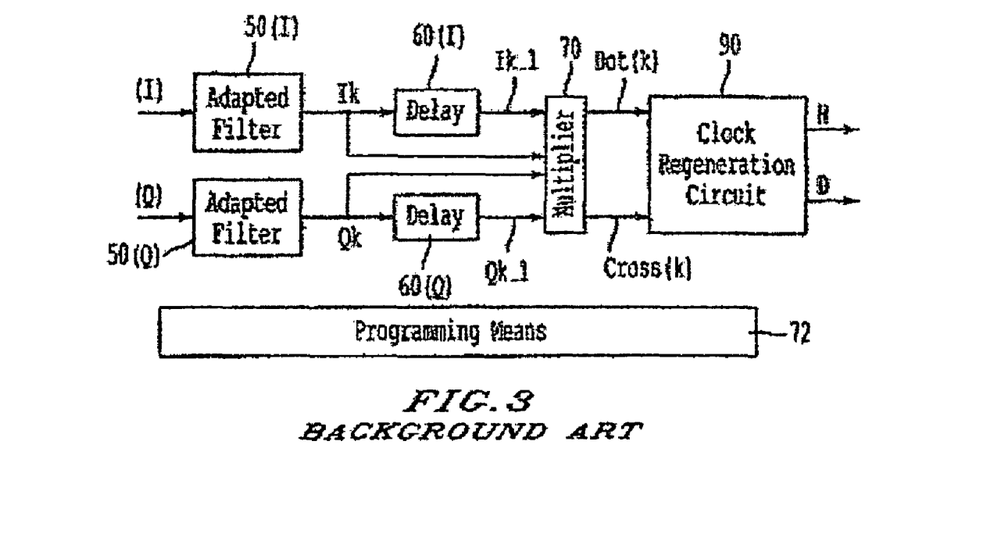
FIG. 3, already described, illustrates a known digital circuit for processing I and Q signals.

In practice, signals can be processed as illustrated in FIG. 3 attached. The receiver shown comprises two analog channels, one to process part I of the signal in phase with the carrier and the other to process part Q in quadrature with this same carrier.

Channel I comprises first adapted filter means 50 (I) capable of fulfilling a first filter function corresponding to the pseudo-random sequence used when sending; these first means output samples $I_k$. The channel I also includes first delay means 60 (I) to perform a first function to introduce a delay equal to the period Ts of the symbols and to output samples $I_{k-1}$.

The channel Q comprises second adapted filter means 50 (Q) capable of performing a second filter function still corresponding to the pseudo-random sequence; these second means output samples $Q_k$; the channel Q also comprises second delay means 60 (Q) to perform a delay function introducing a delay equal to Ts and to output samples $Q_{k-1}$.

The multiplier 70 outputs combinations of products of these samples and particularly a signal denoted Dot(k) that is equal to $I_k I_{k-1} + Q_k Q_{k-1}$ and a signal denoted Cross(k) that is equal to $Q_k I_{k-1} - I_k Q_{k-1}$. The circuit shown in FIG. 3 is used with a circuit 90 that processes the Dot(k) and Cross(k) signals and outputs a clock signal H and data D. A programming means 72 controls the complete system.

This solution does not correct the general problem with this type of receiver due to the fact that the demodulator output signal sometimes represents a signal proportional to the energy transported on a given propagation path (energy equal to the square of the amplitude of the received echo) and sometimes noise.

Therefore the simple integration processing done in a known type of differential receiver corresponds to the sum of energy transported by all propagation paths, and also signals not representative of propagation paths, which deteriorates the signal to noise ratio. In other words, this technique does not isolate correlation peaks.

However, one technique was imagined to attempt to overcome noise existing between correlation peaks. This is the RAKE technique. It consists of isolating a number of propagation paths and adding only the energy transported by these paths. In this approach, a number of adapted filters (correlators) are used to sample a channel and therefore to position the teeth of the "rake", other correlators then being used to track the paths with the highest energy. Processing then summates the squares of the amplitudes of the selected paths.

Information about RAKE type architectures using a coherent modulation can be found in the article entitled "ASIC Implementation of a Direct-Sequence Spread-Spectrum RAKE-Receiver" by Stephen D. LINGWOOD, Hans KAUFMANN, Bruno HALLER, published in IEEE Vehicular Technology Conference VTC'94, Stockholm, June 1994, pp 1-5.

But there are also disadvantages with this solution:
in practice, only a limited number of propagation paths can be tracked (2 to 4 in practice in known embodiments); in the case of a long pulse response in which there is a large number of separate paths, the order of diversity (in other words the number of statistically independent items of information processed at the same time) is limited; not all the information transported by the transmission channel is used, the agility of correlators used to sample the channel to put the teeth of the rake into position must be very good to be able to adapt to fast variations in the transmission channel (coherent modulation).

In an attempt to overcome these disadvantages, the nature of the signal to be processed must be reconsidered and an attempt must be made to imagine a satisfactory processing. In the case of a 2-stage phase modulation called DPSK (Differential Phase Shift Keying), only the Dot(k) signal needs to be analyzed to find the transmitted data. The Cross(k) signal can be used to make an automatic frequency check.

A Dot signal, if there is only one propagation path between the sender and the receiver, is composed of peaks that are sometimes positive and sometimes negative depending on the value of the binary information transmitted. The interval between two consecutive peaks is equal to the duration Ts of a symbol.

In the case of a 4-stage phase modulation called DSPSK (Q for Quaternary), the two Dot and Cross signals must be examined at the same time to find the transmitted data.

If there are several paths, the peaks are doubled, tripled, quadrupled, etc. for each symbol, the number of detected peaks being equal to the number of paths used by the radioelectric wave between the sender and the receiver.

A simple integrator will integrate all signals present, in other words the peaks (corresponding to true information) and the noise (not corresponding to any information). Therefore the signal to noise is low.

French patent FR-A-2 752 330 deposited by the Applicant of this patent describes a means of overcoming this disadvantage. The signal obtained using the sum of the squares of the Dot(k) and the Cross(k) signals, and then extracting the square root of this sum, directly reflects the energy distribution of the different propagation paths, the amplitude of each peak being the energy transported by the corresponding path. Therefore, according to this document, the first step is to measure a quantity E (k) defined as follows:

$$E(k)=[\text{Dot}(k)^2+\text{Cross}(k)^2]^{1/2}$$

The next step is an operation to take the average of the energy E(k) over a few symbols, in other words a few values with rank k. The number N of symbols used for this estimate of the average must correspond to a duration less than the channel coherence time, in other words the time beyond which two distinct waves with the same origin no longer interfere. It is assumed that the transmission channel keeps its coherence properties for a duration equal to N times the duration Ts of a symbol (stationarity assumption).

This average $E^{moy}$ is then used to weight the instantaneous Dot(k) and Cross(k) signals, for example by simple multiplication of Dot(k) and Cross(k) by the value $E^{moy}$. This then gives two new signals called weighted signals, namely Dot$(k)^{moy}$ and Cross$(k)^{moy}$. These weighted signals that reflect the average of the energy on several symbols are then used for the integration processing over a symbol period Ts, the clock is then regenerated and the data are retrieved.

Taking an average of the instantaneous output is a means of keeping the peaks corresponding to propagation paths on the Dot$^{moy}$ and Cross$^{moy}$ outputs (using the channel stationarity assumption on the few symbols used) and very significantly reducing the noise level generated by the electromagnetic environment, frequency sliding or phase rotation.

The advantages obtained are then as follows:
improvement of the signal to noise ratio of the Dot$^{moy}$ and Cross$^{moy}$ outputs before the stages for integration, retrieval of the clock and restitution of the sent binary data, use of all energy in all propagation paths (unlike RAKE type architectures),
simply obtaining an estimate of the pulse response of the transmission channel with no limitation to a given number of paths considered as having the highest energy.

Figure 4:
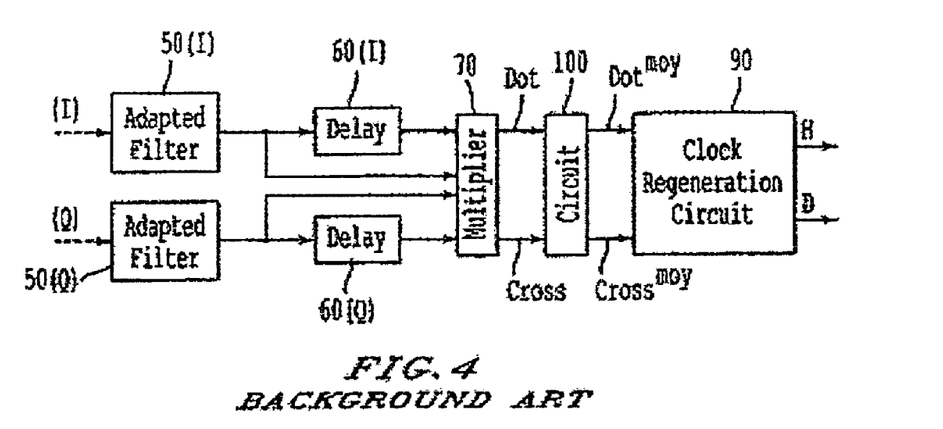
FIG. 4, already described, shows the block diagram of a differential demodulation receiver with combination of multiple paths.
Figure 5:
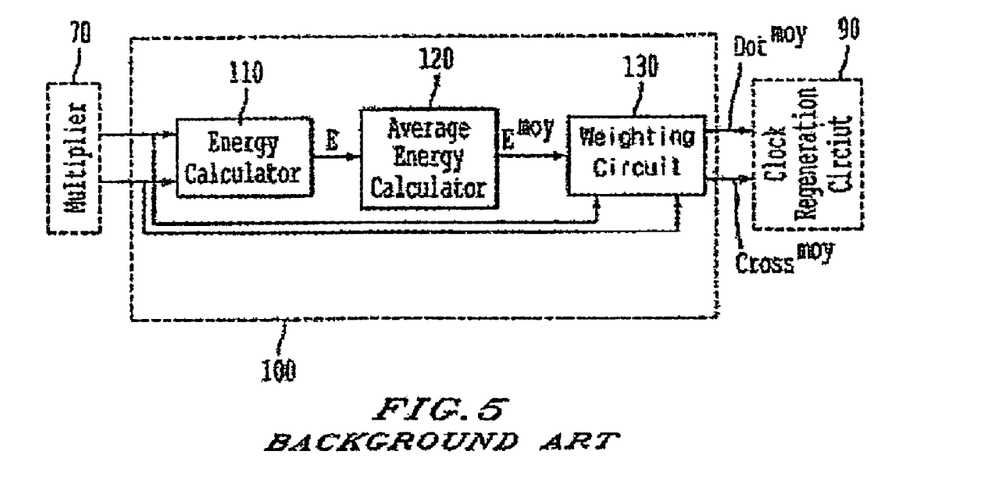
FIG. 5, already described, shows the block diagram of the means for calculating the energy and the average and the weighting operation.

FIG. 4 shows a receiver conforming with this document. This receiver comprises means already described in FIG. 3 and that have the same numeric references. It further comprises a circuit 100 placed between the multiplier 70 and the data reproduction and clock regeneration circuit 90. An example of this circuit 100 is illustrated in FIG. 5. This circuit comprises a circuit 110 for calculation of the energy E, a circuit 120 for calculation of the average $E^{moy}$, and a circuit 130 for weighting the Dot and Cross signals (the rank k will be omitted in the rest of this description for simplification purposes). The circuit 130 outputs signals weighted by the average, namely the Dot$^{moy}$ and Cross$^{moy}$ weighted signals that are then applied to circuit 90.

The document mentioned shows one possible embodiment of these circuits (see FIG. 8 in the document).

Although this multiple path combination technique recommended in document U.S. Pat. No. 2,757,330 really does result in the stated advantages, these advantages are related to the differential modulation DP but they do not take advantage of the MOK modulation described above. The purpose of this invention is to combine these various techniques to combine their advantages.

PRESENTATION OF THE INVENTION

According to a first characteristic of the invention, a mixed demodulation is used in the sense that it partly uses the MOK modulation and partly the phase differential DP modulation. Since the DP modulation is differential, the demodulation is non-coherent. Therefore some of the bits in each symbol are transmitted using the MOK technique, and some of the bits are transmitted using the DP technique with spectrum spreading using the pseudo-random sequence selected in the MOK part. In reception, the first step is to restore the pseudo-random sequence used in transmission by adapted parallel filtering, therefore retrieving some of the symbol bits, and the appropriate filtered signal is demodulated differentially to find the other part of bits. Thus, the advantages specific to each modulation/demodulation are retained, while increasing the spectral efficiency.

To emphasize the mixed nature of his process, the Applicant refers to it with the abbreviation "DP-MOK", illustrating the differential nature of the phase demodulation part and its combination with the MOK technique.

It may be observed that this combination of the MOK modulation/demodulation technique and the DP technique would initially seem to be a nonsense because in MOK demodulation, the successive signals corresponding to the successive symbols appear on different channels since, in general, successive symbols are different and different codes correspond to them. However in DP demodulation, a signal and the previous signal have to be processed on the same channel. Therefore, these two techniques would apparently need different connections. Therefore, the combination according to the first characteristic of the invention requires special switching (or connection) between the MOK part and the DP part.

According to a second characteristic of the invention, a combination of paths is made in the differential demodulation part by weighting peaks, and this weighting is used in the MOK part before selecting the channel with the highest energy. Therefore, processing of diversity is also done in the MOK part by weighting the energy of each channel. In other words, the transmission channel is estimated in the DP part but the estimate is used in the DP part and in the MOK part.

It should be noted that document U.S. Pat. No. 5,692,007 already described a receiver making use of combined phase differential (DP) and multiple orthogonal signals (MOK) modulations. But the receiver described is a simplified version of a coherent receiver in which the phase is estimated for each symbol using a table and in which the differential demodulation is done by subtracting the phase of two consecutive symbols. Therefore it is not a non-coherent reception like this invention. Furthermore, this document does not take account of multiple propagation paths using a RAKE structure.

The purpose of this invention is a process for non-coherent reception of a signal with spectrum spreading and DP-MOK mixed modulation with combination of multiple paths, characterized in that it comprises the following operations:

A) the signal is processed in several M channels in parallel; in each channel, the signal is filtered by a filter adapted to a pseudo-random sequence specific to the channel; the energy of the filtered signal is measured; this energy is weighted by a weighting factor; the channel containing the weighted signal with the highest power is determined; the number of this channel is decoded to reproduce the first information symbols (mMOK);

B) the filtered signal with the highest energy is selected, a differential phase demodulation is made of this signal which produces multiple correlation peaks corresponding to multiple paths; the energy of these peaks is calculated; this energy is weighted by the said weighting factor; this weighted energy is decoded to restore the second information symbols (mDP);

C) the average of the correlation peaks is taken over a determined duration corresponding to several information symbols, this average forming the said weighting factor acting on the energy of the filtered signal in each channel and on the energy of the correlation peaks.

Another purpose of this invention is a non-coherent receiver for use of this process, characterized in that it comprises:

A) several M channels in parallel, each channel comprising a filter adapted to a pseudo-random sequence specific to the channel; a circuit for measuring the energy of the filtered signal; a circuit for weighting this energy by a weighting factor; means of determining the channel that contains the weighted signal with the highest energy; a MOK decoder receiving the number of this channel, and in response restoring the first information symbols (mMOK);

B) means of selecting the filtered signal with the highest energy; a differential phase demodulator which produces multiple correlation peaks corresponding to multiple paths; a circuit for weighting the energy of the peaks by the said weighting factor; a decoder restoring the second information symbols (mDP);

C) means of calculating the average energy of the correlation peaks over a determined duration corresponding to several information symbols, this average forming the said weighting factor, the output of these means being connected to the weighting circuits of the various channels and the circuit for weighting the energy of the correlation peaks.

DETAILED DESCRIPTION OF PARTICULAR EMBODIMENTS

Figure 6:
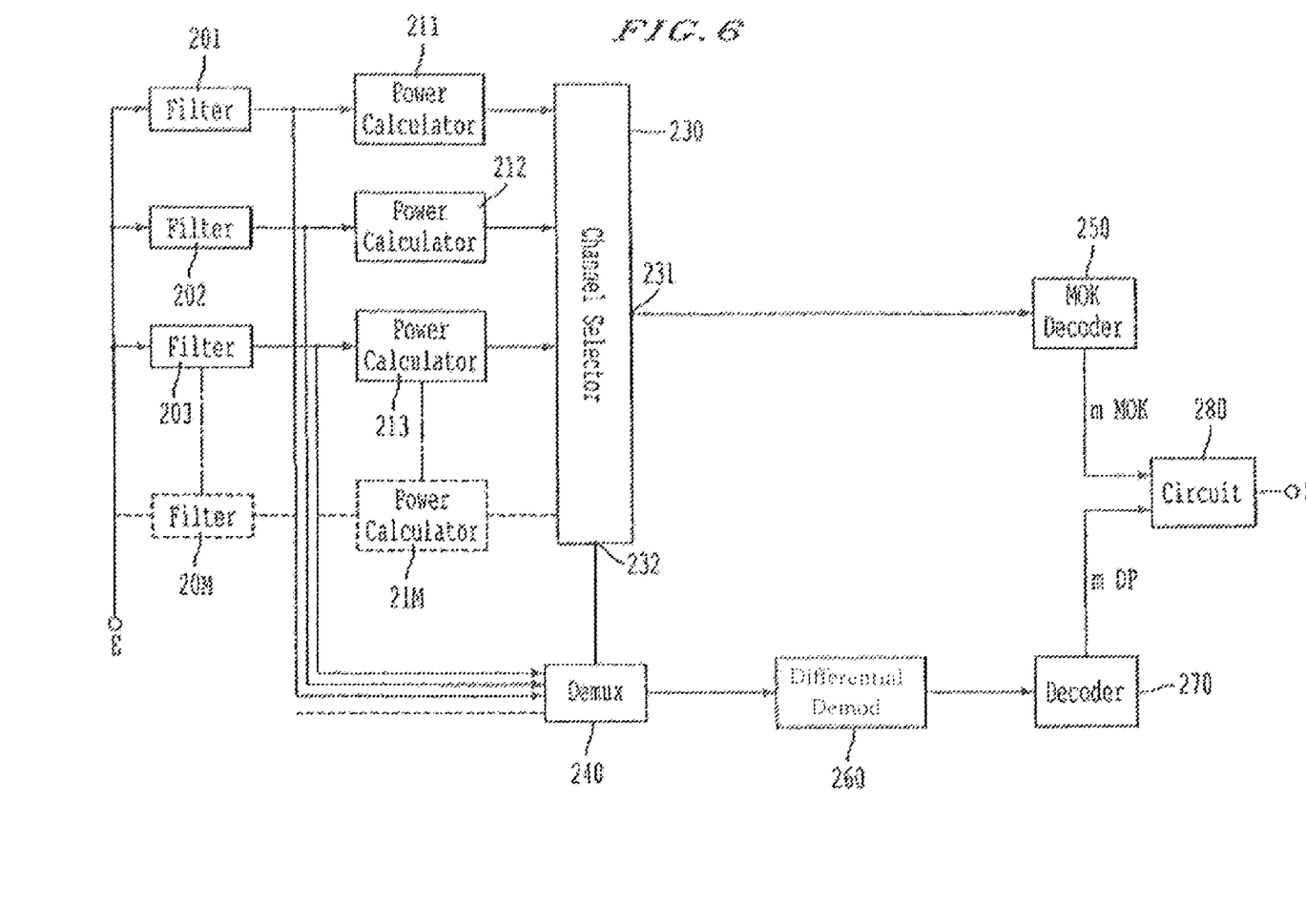
FIG. 6 illustrates the first characteristic of the invention related to the mixed nature of the demodulations used (DP and MOK)

The receiver shown in FIG. 6 comprises a general input E connected to several M channels in parallel with filters 201, 202, 203, . . . , 20M adapted to pseudo-random spreading sequences used for sending, circuits 211, 212, 213, . . . , 21M calculating the power of filtered signals, a circuit 230 to determine which channel contains the most powerful filtered signal, this circuit having two outputs 231, 232, the first outputting the number of the channel containing the filtered signal with the highest energy, a MOK decoder 250 which uses this number to output the first data mMOK values corresponding to this particular code.

The receiver also comprises a demultiplexer type circuit 240 designed to select the filtered signal with the highest energy, this demultiplexer being controlled by the signal output by a second output 232 from circuit 230, a differential demodulator 260 comprising means already described in relation to FIG. 2 (30, 32, 34) or FIG. 3 (60 (I), 60 (Q), 70), and a decoder 270 capable of restoring the second mDP data transmitted by this differential modulation.

A circuit 280 groups these first and second data to output the symbol transmitted with its m data where m=mMOK+mDP, onto a general output S.

Figure 7:
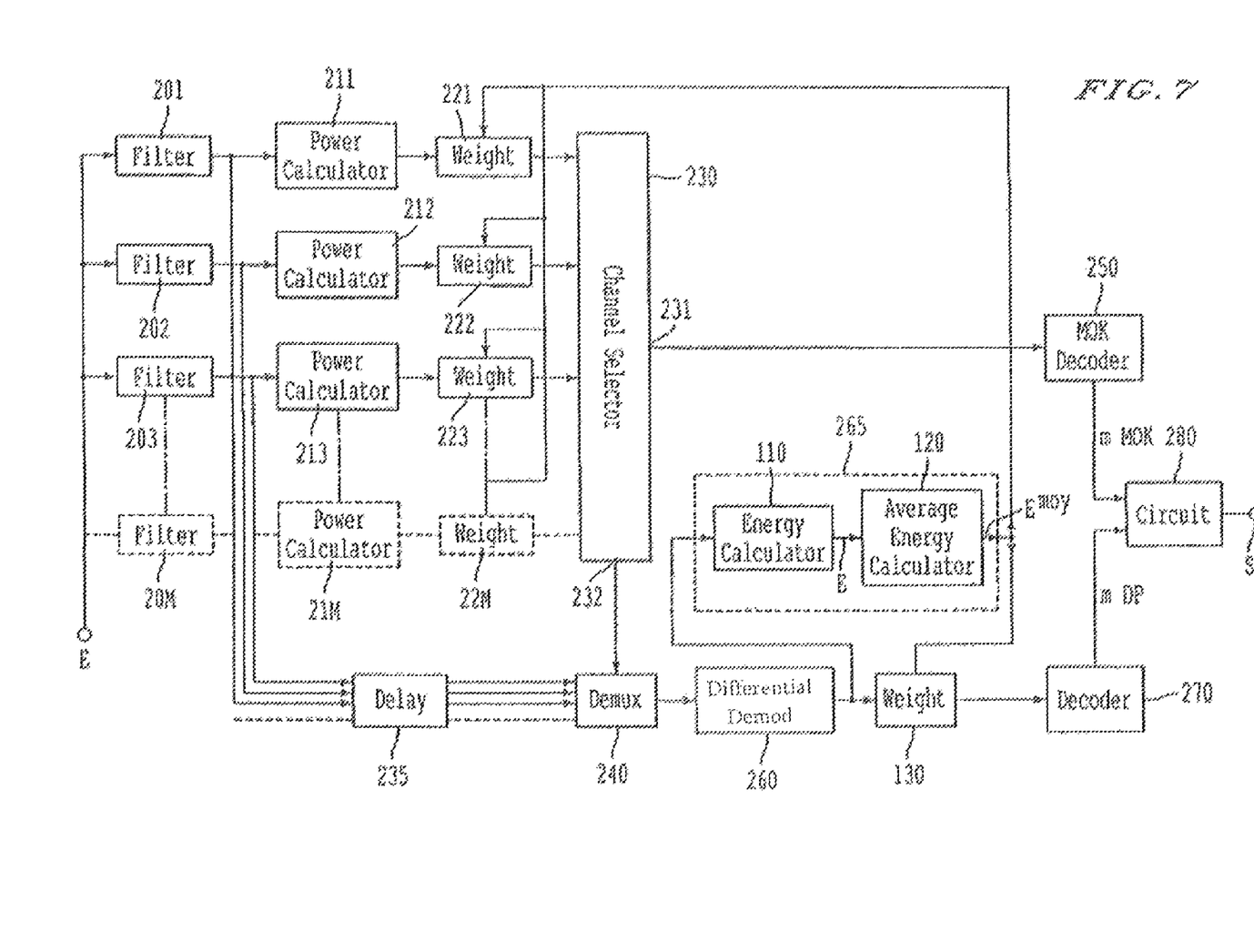
FIG. 7 illustrates the second characteristic of the invention related to the weighting done in the DP part and in the MOK part.

The receiver shown in FIG. 7 shows the receiver means in FIG. 6 with the same numeric references and shows the assumed diversity means. These means comprise an assembly 265 for calculating the weighting factor, for example this assembly comprising a circuit 110 for calculating the energy E of the correlation peaks and a circuit 120 for calculating the average $E^{moy}$ of this energy shown in FIG. 5. This average energy is used in a circuit 130 to weight the signal output by circuit 260 (for example the Dot and Cross signals) as shown in FIG. 4, and also for weighting the energy calculated by the previous circuits 211, 212, 213, . . . , 21M, in weighting circuits 221, 222, 223, . . . , 22M. This weighting is done before the selection is made by circuit 230. The signals taken from each of the channels need to be suitably delayed, as shown by the delay line 235, so that switching can be done correctly.

For example, the following rules could be used to choose the values of mMOK and mDP:

- a large value of mMOK (for example greater than 4) considerably increases the complexity (the increase is exponential);
- a large value of mDP (for example greater than 2) quickly reduces the robustness of the modulation in difficult environments.

Therefore, a compromise is usually necessary when choosing these two parameters. For example, for codes with a length of 32 for which the DP part is quaternary (DQPSK) and for which the MOK part is done with M=8, values of m=5 and mMOK=3 and mDP=2 could be used. The resulting spectral efficiency is 0.078 bps/Hz. In conventional DQPSK, it would be equal to 0.031 bps/Hz with the same processing gain and 0.078 bps/Hz with a processing gain corrected from 15 to 10 dB.

Figure 8:
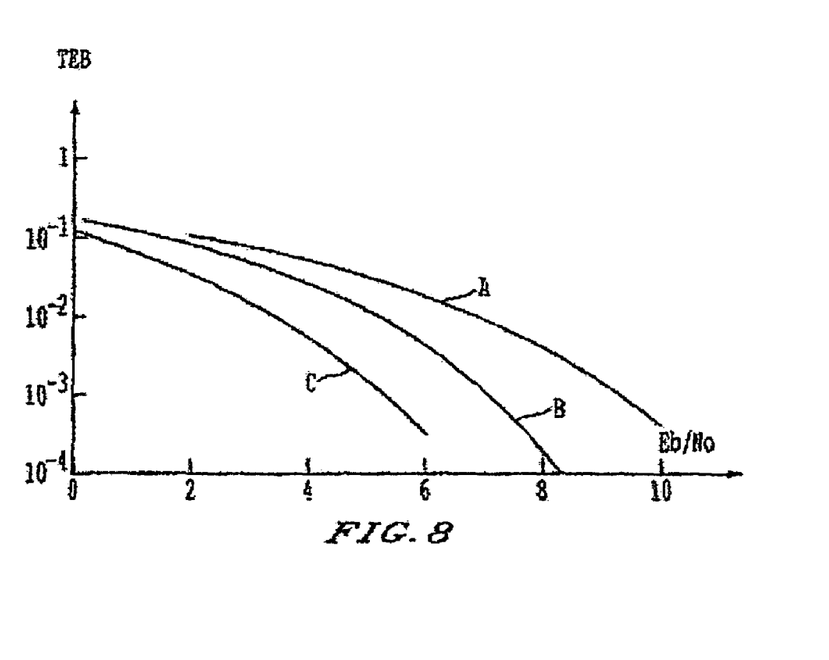
FIG. 8 represents the binary error rate as a function of the signal-to-noise ratio for several types of demodulations.

In terms of the binary error rate, FIG. 8 (plate 1/5) shows variations of this BER as a function of the signal to noise ratio Eb/No shown on the abscissa and expressed in dB. Curve A corresponds to the conventional DQPSK modulation with a speed of 1 Mbsp, curve B to MOK modulation with M=8 at 1.5 Mbps, and finally curve C in this invention to DP-MOK modulation with M=8 and a speed of 2.5 Mbps.

What is claimed is:

1. A method for non-coherent reception of a signal with spectrum spreading, comprising:
    performing a non-coherent multiple orthogonal signal demodulation operation on the signal;
    performing, in a parallel arrangement with said non-coherent multiple orthogonal signal demodulation operation, a non-coherent phase differential demodulation operation on a derived signal based on the signal; and
    combining together into a group results of the multiple orthogonal signal demodulation operation on the signal and the phase differential demodulation operation on the derived signal to provide a demodulated output signal.

2. The method of claim 1, wherein said performing a non-coherent multiple orthogonal signal demodulation operation comprises:
    processing the signal in a plurality of channels in parallel, wherein for each channel the signal is filtered by a filter adapted to a pseudo-random sequence specific to the channel.

3. The method of claim 2, wherein said performing a non-coherent multiple orthogonal signal demodulation operation further comprises:
    for each channel, measuring the energy of the filtered signal.

4. The method of claim 3, wherein said performing a non-coherent multiple orthogonal signal demodulation operation further comprises:
    for each channel, weighting the energy of the filtered signal by a weighting factor; and determining which of the plurality of channels has the weighted signal with the highest power.

5. The method of claim 4, wherein said performing a non-coherent multiple orthogonal signal demodulation operation further comprises:
    decoding the number of the channel with the weighted signal having the highest power to reproduce one or more first information symbols.

6. The method of claim 5, wherein said performing a non-coherent phase differential demodulation operation on the derived signal comprises:
    producing multiple correlation peaks corresponding to multiple paths through differential phase demodulation of the filtered signal with the highest energy.

7. The method of claim 6, wherein said performing a non-coherent phase differential demodulation operation on the derived signal further comprises:
    calculating the energy of the multiple correlation peaks.

8. The method of claim 7, wherein said performing a non-coherent phase differential demodulation operation on the derived signal further comprises:
    weighting the calculated energy by the weighting factor.

9. The method of claim 8, wherein said performing a non-coherent phase differential demodulation operation on the derived signal further comprises:
    decoding the weighted calculated energy to restore one or more second information symbols.

10. The method of claim 9, further comprising:
    averaging the correlation peaks taken over a predetermined period of time corresponding to a plurality of information symbols, wherein the weighting factor is defined by the averaging of the correlation peaks.

11. An apparatus capable of non-coherent reception of a signal with spectrum spreading, comprising:
    means for performing a non-coherent multiple orthogonal signal demodulation operation on the signal;
    means for performing a non-coherent phase differential demodulation operation on a derived signal based on the signal, wherein the means for performing a non-coherent phase differential demodulation operation is arranged in parallel with the means for performing a multiple orthogonal signal demodulation; and
    means for combining together into a group the results of the multiple orthogonal signal demodulation operation on the signal and the phase differential demodulation operation on the derived signal to provide a demodulated output signal.

12. The apparatus of claim 11, wherein said means for performing a non-coherent multiple orthogonal signal demodulation operation comprises:
    means for processing the signal in a plurality of channels in parallel, wherein for each channel the signal is to be filtered by a filter adapted to a pseudo-random sequence specific to the channel.

13. The apparatus of claim 12, wherein said means for performing a non-coherent multiple orthogonal signal demodulation operation further comprises:
    for each channel, means for measuring the energy of the filtered signal.

14. The apparatus of claim 13, wherein said means for performing a non-coherent multiple orthogonal signal demodulation operation further comprises:
    for each channel, means for weighting the energy of the filtered signal by a weighting factor; and
    means for determining which of the plurality of channels has the weighted signal with the highest power.

15. The apparatus of claim 14, wherein said means for performing a non-coherent multiple orthogonal signal demodulation operation further comprises:
    means for decoding the number of the channel with the weighted signal having the highest power to reproduce one or more first information symbols.

16. The apparatus of claim 15, wherein said means for performing a non-coherent phase differential demodulation operation on the derived signal comprises:
    means for producing multiple correlation peaks corresponding to multiple paths through differential phase demodulation of the filtered signal with the highest energy.

17. The apparatus of claim 16, wherein said means performing a non-coherent phase differential demodulation operation on the derived signal further comprises:
    means for calculating the energy of the multiple correlation peaks.

18. The apparatus of claim 17, wherein said means for performing a non-coherent phase differential demodulation operation on the derived signal further comprises:
  means for weighting the calculated energy by the weighting factor.

19. The apparatus of claim 18, wherein said means for performing a non-coherent phase differential demodulation operation on the derived signal further comprises:
  means for decoding the weighted calculated energy to restore one or more second information symbols.

20. The apparatus of claim 19, further comprising:
  means for averaging the correlation peaks taken over a predetermined period of time corresponding to a plurality of information symbols, wherein the weighting factor is defined by the averaging of the correlation peaks.

21. An apparatus capable of non-coherent reception of a signal with spectrum spreading, comprising:
  a plurality of filters associated with a plurality of channels, wherein the plurality of filters are capable of processing a signal in parallel, and wherein for each of the plurality of channels, the signal is filtered by a filter adapted to a pseudo-random sequence specific to the channel;
  a plurality of power calculator circuits capable of measuring the energy of a filtered signal, wherein each of the plurality of power calculator circuits is configured to be coupled to one of the plurality of filters;
  a plurality of weighting circuits capable of weighting the energy of a filtered signal by a weighting factor, wherein each of the plurality of weighting circuits is configured to be coupled to one of the plurality of power calculator circuits;
  a channel selector circuit capable of determining which of the plurality of channels has the weighted signal with the highest power;
  a decoder circuit capable of reproducing one or more first information symbols according to the number of the channel determined to have the weighted signal with the highest power;
  an energy calculator capable of calculating the energy of multiple correlation peaks based at least in part on at least one filtered signal generated by one of the plurality of filters;
  an average energy calculator capable of averaging the energy of the multiple correlation peaks to generate the weighting factor;
  a second decoder circuit configured to obtain the weighting factor and adapted to apply the weighting factor to at least one signal based on a filtered signal generated by one of the plurality of filters, and further configured to restore one or more second information symbols based on a signal obtained by applying the weighting factor to the at least one signal.

22. A system capable of non-coherent transmission of a signal with spectrum spreading, comprising:
  a transmitter capable of modulating a signal by differential phase modulation and multiple orthogonal signal modulation; and
  a receiver to receive a signal modulated by differential phase modulation and multiple orthogonal signal modulation, comprising
  means for performing a non-coherent multiple orthogonal signal demodulation operation on the signal;
  means for performing a non-coherent phase differential demodulation operation on a derived signal based on the signal, wherein the means for performing a non-coherent phase differential demodulation operation is arranged in parallel with the means for performing a multiple orthogonal signal demodulation; and
  means for combining together into a group the results of the multiple orthogonal signal demodulation operation on the signal and the phase differential demodulation operation on the derived signal to provide a demodulated output signal.

23. The system of claim 22, wherein said means for performing a non-coherent multiple orthogonal signal demodulation operation comprises:
  means for processing the signal in a plurality of channels in parallel, wherein for each channel the signal is to be filtered by a filter adapted to a pseudo-random sequence specific to the channel.

24. The system of claim 23, wherein said means for performing a non-coherent multiple orthogonal signal demodulation operation further comprises:
  for each channel, means for measuring the energy of the filtered signal.

25. The system of claim 24, wherein said means for performing a non-coherent multiple orthogonal signal demodulation operation further comprises:
  for each channel, means for weighting the energy of the filtered signal by a weighting factor; and
  means for determining which of the plurality of channels has the weighted signal with the highest power.

26. The system of claim 25, wherein said means for performing a non-coherent multiple orthogonal signal demodulation operation further comprises:
  means for decoding the number of the channel with the weighted signal having the highest power to reproduce one or more first information symbols.

27. The system of claim 26, wherein said means for performing a non-coherent phase differential demodulation operation on the derived signal comprises:
  means for producing multiple correlation peaks corresponding to multiple paths through differential phase demodulation of the filtered signal with the highest energy.

28. The system of claim 27, wherein said means performing a non-coherent phase differential demodulation operation on the derived signal further comprises:
  means for calculating the energy of the multiple correlation peaks.

29. The system of claim 28, wherein said means for performing a non-coherent phase differential demodulation operation on the derived signal further comprises:
  means for weighting the calculated energy by the weighting factor.

30. The system of claim 29, wherein said means for performing a non-coherent phase differential demodulation operation on the derived signal further comprises:
  means for decoding the weighted energy to restore one or more second information symbols.

31. The system of claim 30, further comprising:
  means for averaging the correlation peaks taken over a predetermined period of time corresponding to a plurality of information symbols, wherein the weighting factor is defined by the averaging of the correlation peaks.

32. The system of claim 22, wherein:
  the means for performing a non-coherent multiple orthogonal signal demodulation comprises:
  a plurality of filters associated with a plurality of channels, wherein the plurality of filters are capable of processing a signal in parallel and wherein for each of the plurality of channels the signal is to be filtered by a filter adapted to a pseudo-random sequence specific to the channel;

a plurality of power calculator circuits capable of measuring the energy of a filtered signal, wherein each of the plurality of power calculator circuits is to be coupled to one of the plurality of filters;

a plurality of weighting circuits capable of weighting the energy of a filtered signal by a weighting factor, wherein each of the plurality of weighting circuits is coupled to one of the plurality of power calculator circuits;

a channel selector circuit capable of determining which of the plurality of channels has the weighted signal with the highest power; and a decoder circuit capable of reproducing one or more first information symbols according to the number of the channel determined to have the weighted signal with the highest power;

wherein the receiver further comprises:

an energy calculator capable of calculating the energy of multiple correlation peaks based at least in part on at least one filtered signal generated by one of the plurality of filters; and an average energy calculator capable of averaging the energy of the multiple correlation peaks to generate the weighting factor; and wherein the means for performing a non-coherent phase differential demodulation operation comprises:

a decoder capable of decoding a signal weighted by the weighting factor to restore one or more second information symbols.

33. The method of claim 1, wherein said performing a non-coherent phase differential demodulation on the signal comprises:

selecting the derived signal for phase differential demodulation based on a result obtained during said performing a multiple orthogonal signal demodulation.

* * * * *